United States Patent [19]

Hannoyer

[11] Patent Number: 4,497,025
[45] Date of Patent: Jan. 29, 1985

[54] PROCEDURE AND SYSTEM FOR DETECTING COLLISIONS AND CONTROLLING SAFETY

[75] Inventor: Gilles Hannoyer, Saint-Germain En-Laye, France

[73] Assignee: Regie Nationale Des Usines Renault, Boulogne-Billancourt, France

[21] Appl. No.: 367,087

[22] Filed: Apr. 9, 1982

[30] Foreign Application Priority Data

Apr. 28, 1981 [FR] France ............... 81 08424

[51] Int. Cl.³ ............................ B60R 21/08
[52] U.S. Cl. ................... 364/424; 364/426; 340/52 H
[58] Field of Search ............ 364/424, 431.04, 431.07, 364/566, 426; 340/52 R, 52 E, 52 F, 52 H, 521, 61, 53; 200/61.5; 180/274

[56] References Cited

U.S. PATENT DOCUMENTS

| 3,809,874 | 5/1974 | Pozzetti et al. | 364/811 |
| 3,921,129 | 11/1979 | Sumida | 340/52 H |
| 4,087,782 | 5/1978 | Oishi et al. | 340/52 H |
| 4,117,730 | 10/1978 | Spies et al. | 340/52 H |
| 4,220,871 | 9/1980 | Yasui et al. | 340/52 H |
| 4,222,030 | 9/1980 | Yasui et al. | 340/52 H |
| 4,359,715 | 11/1982 | Langer et al. | 340/52 H |
| 4,366,465 | 12/1982 | Veneziano | 340/52 R |

FOREIGN PATENT DOCUMENTS

2808872 2/1978 Fed. Rep. of Germany .
2467740 10/1979 France .

Primary Examiner—Edward J. Wise
Assistant Examiner—Thomas G. Black
Attorney, Agent, or Firm—Oblon, Fisher, Spivak, McClelland & Maier

[57] ABSTRACT

A method of detecting collisions and controlling safety devices utilizing a capacitive deceleration sensor and a circuit which forms the sensor output signal as well as an analog/numerical converter, a calculator and an actuator controlled by a numerical calculator. The numerical calculator processes the numerical signal which represents the deceleration output from the converter and calculates a weighted acceleration, a mean value for the weighted acceleration, and an algorithm equal to the sum of the mean value and a variable correcting term. This process triggers the actuator when the algorithm exceeds a predetermined threshold.

5 Claims, 12 Drawing Figures

PROCEDURE AND SYSTEM FOR DETECTING COLLISIONS AND CONTROLLING SAFETY

BACKGROUND OF THE INVENTION

1. Field of the Invention

The present invention relates to a procedure and an automatic system for detecting collisions and for controlling devices which provide for the safety of passengers aboard a vehicle.

2. Description of the Prior Art

Known systems of this type exist which use one or more sensors which deliver a signal that varies continually with acceleration, safety devices which electromagnetically unlock the door of a vehicle, pyrotechnically controlled devices which trigger the inflation of protective air bags, mechanically and/or pyrotechnically controlled seat belt retractors, seat belt releasing systems, or others, such as an electronic circuit which calculates from accelerometric data provided by sensors certain parameters whose values control the release of security device(s).

Systems of the latter type represent a more or less satisfactory compromise between rapid safety device release in the event of an actual vehicle crash and a minimalization of the risk of untimely release under the influence of various paracitic shocks such as jolts or shocks caused when the vehicle is running over bad pavement (potholes, cobble stones, etc.)

The present invention provides a procedure and a system which assure improved immunity against the abovementioned acceleration or paracitic shocks while providing more rapid release in the event of an actual crash.

SUMMARY OF THE INVENTION

The objection of the present invention is to provide a procedure for detecting collisions and for controlling the safety devices for the passengers in a vehicle, in which the decelerations to which the vehicle is subjected are continuously measured. The measurement signal obtained in this manner is converted into a numerical signal ($\gamma$) representing the deceleration of the vehicle. The numerical signal ($\gamma$) is then processed compared with predetermined values. The release of the safety devices are signaled as a function of the result of the comparison, wherein cycles which have a constant duration, effect operations according to which a weighted acceleration value ($\gamma p$) is calculated based on the numerical deceleration signal ($\gamma$) and at least one of three constants ($\Delta_1$, $\Delta_2$, $\Delta_3$). An exponential mean value ($S_n$) is compared to at least a first ($S_1$) and a second ($S_2$) predetermined value, and one of the constants ($\Delta_1$, $\Delta_2$, $\Delta_3$) is chosen for the weighted acceleration calculation ($\gamma p$) during the following cycle as a function of the result of the comparison. Each time that the exponential mean value ($S_n$) successively exceeds the first predetermined value ($S_1$) and the second predetermined value ($S_2$), a correcting term is calculated whose value is a function of the time between the successive excessions of the two predetermined values ($S_1$, $S_2$), while the calculated value is retained as the correcting term as long as the exponential mean value ($S_n$) remains equal to or greater than the first predetermined value ($S_1$) and a zero value is given as the correcting term if the exponential mean value decreases below the first predetermined value ($S_1$). An algorithm (Algo) is then calculated equal to the sum of the exponential mean value ($Sn$) and the correcting term, the algorithm is compared to at least one threshold value ($D_1$) and certain of said safety devices are released if said algorythm is greater than said threshold value ($D_1$).

According to one characteristic of the invention the weighted acceleration ($\gamma p$) is calculated by comparing the value of the numerical deceleration signal ($\gamma$) to the sum of the weighted deceleration ($\gamma p$) and the constant ($\Delta_1$, $\Delta_2$, $\Delta_3$) calculated during the preceding cycle and by giving the weighted acceleration the value of that sum if the value of the numerical deceleration signal ($\gamma p$) is greater than that sum, and by giving it the value of the numerical deceleration signal ($\gamma$) if the latter is less than or equal to that sum.

According to another characteristic of the invention, the exponential mean value is calculated according to the formula:

$$S_{(n+1)} = S_{(n)} + \gamma p - (S_{(n)}/\alpha)$$

wherein $S_{(n+1)}$ represents the actual value of the exponential mean value, $S_{(n)}$ represents the value of the exponential mean value calculated during the preceding cycle, ($\gamma p$) represents the value of the weighted acceleration which is to be calculated at the beginning of the following cycle, and $\alpha$ is a constant.

According to another characteristic of the invention the value of the correcting term is calculated by means of a counter which is set at a predetermined number ($C_o$) when the exponential mean value ($S_{n+1}$) exceeds the first predetermined value ($S_1$) and which is computed in each cycle. The computation by the counter being interrupted when the exponential mean value ($S_{n+1}$) exceeds the second predetermined value ($S_2$) after having exceeded the first ($S_1$) or when the counter reading reaches a value of zero. The correcting term being a function of the computation of the counter at the moment of the interruption multiplied by a coefficient ($2^1$).

BRIEF DESCRIPTION OF THE DRAWINGS

Other characteristics and advantages of the invention will be disclosed by the description which will describe two different embodiments given solely by way of an example and illustrated by the attached drawings, wherein.

DESCRIPTION OF THE PREFERRED EMBODIMENTS

Figure 1:
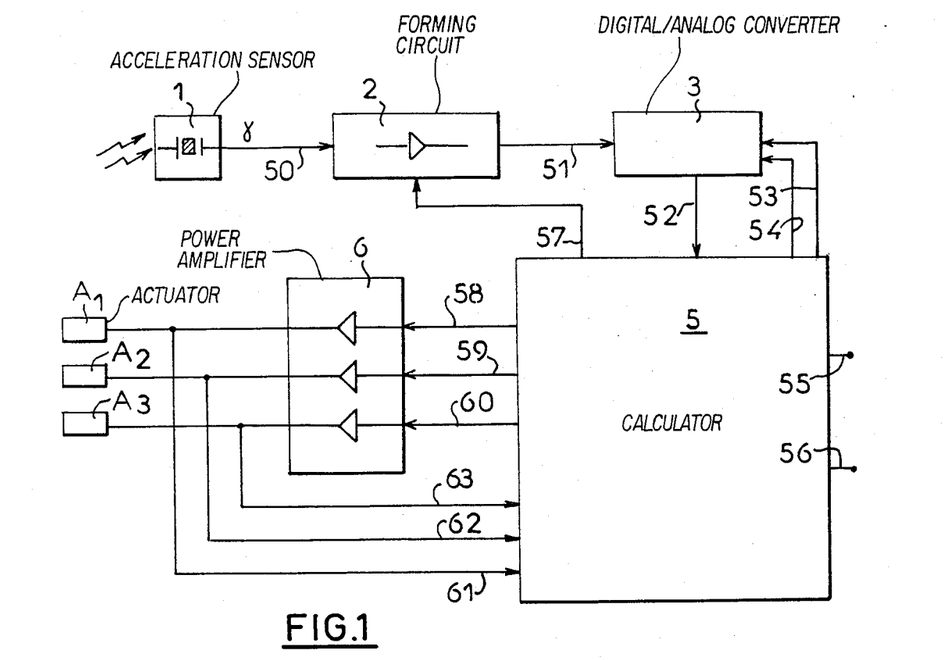
FIG. 1 is a synoptic diagram illustrating the general structure of the system according to the invention.

Referring now to the drawings, wherein like reference numerals designate identical or corresponding parts throughout the several views, and more particularly to FIG. 1 thereof, the collision detection and control system comprises one or more acceleration sensors 1, for example of the piezoelectric type, which provide an electric signal which varies continuously with acceleration. This signal is carried by a lead 50 to a forming circuit 2 whose output is connected to a numerical-analog converter 3 by way of lead 51. The output of the converter 3 is connected by a data generation bus 52 to a calculator 5.

The calculator 5 is also connected to the converter 3 by the leads 53 and 54 which are respectively intended to transmit the output of the numerical-analog conversion and the converter reading. The calculator 5 comprises a diagnostic output 55, a default signal output 56 (not shown) and a control connection 57 of sensor 1 connected to the forming circuit 2.

The calculator 5 also comprises control outputs 58, 59, 60 connected to corresponding actuators $A_1$, $A_2$, $A_3$ by means of a power amplifier 6, and the diagnostic inputs 61, 62, 63 associated respectively with the actuators $A_1$, $A_2$, $A_3$. Although three actuators are depicted in FIG. 1, there can be a greater or lesser quantity of them, as well.

Figure 2:
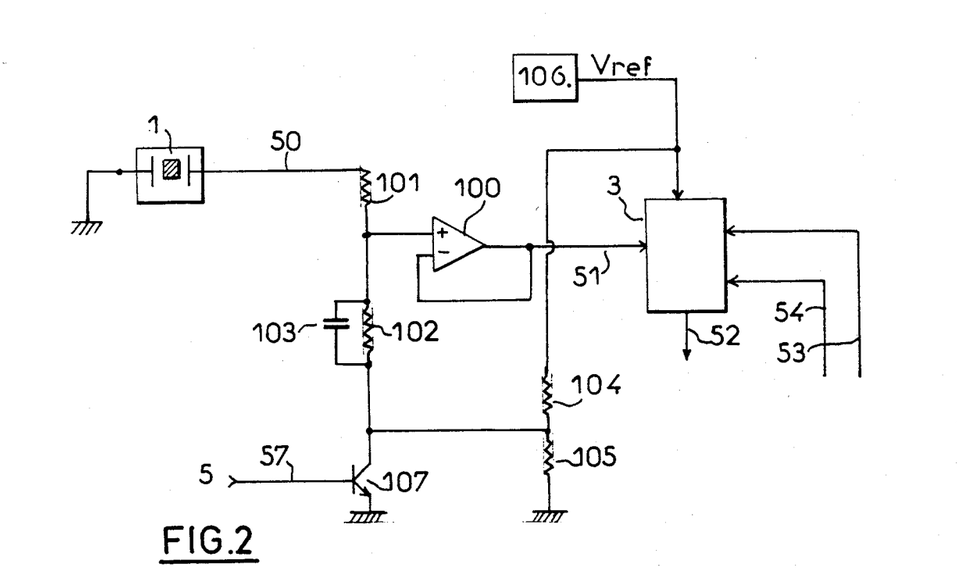
FIG. 2 is an electrical diagram essentially illustrating an embodiment of the circuit of the system shown in FIG. 1.

Referring now to FIG. 2, the sensor 1 is connected to the positive input of an amplifier 100 by means of lead 50 and a resistor 101. This positive input is also grounded through resistor 102, with which a condensor 103 is connected in parallel, and a transistor 107 connected with a common emitter. The base of the transistor 107 is connected to control lead 57 of the sensor, and its collector is polarized by a potentiometer made up of two resistors 104 and 105 connected in series between a voltage regulator 106, furnishing a reference voltage Vref, and the ground. This reference voltage Vref is applied to the numerical/analog converter 3, just as the output 51 of the amplifier 100, connected to its own negative input, is connected to the input of the converter 3.

Figure 3:
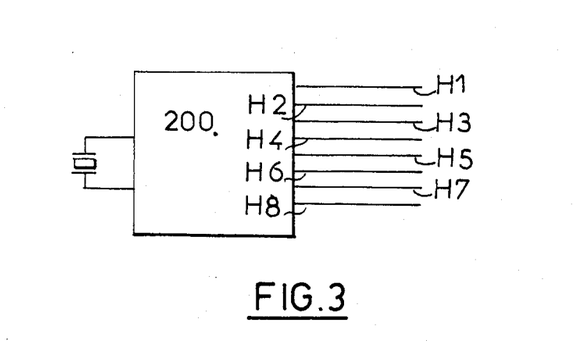
FIG. 3 illustrates a timing device used in the system of FIG. 1.
Figure 5:
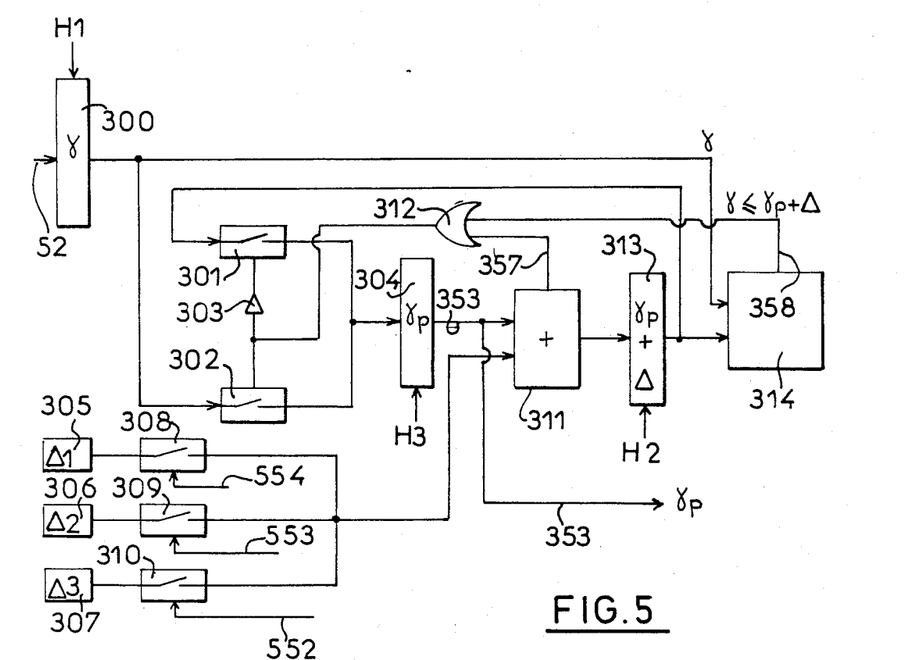
FIGS. 5 to 8 together constitute a cable calculator used with the timing device in FIG. 3 in a first embodiment of the system in FIG. 1.

As shown in FIG. 5, the data generation bus 52 is connected to the input of a register 300 which also receives the $H_1$ signal of the timing device 200 as shown in FIG. 3. The output of the register 300 is connected, on the one hand to one input of a numerical comparator 314, and on the other hand to a multigate tri-state 302. The tri-state 302 is connected to a multigate tri-state 301 by an invertor 303 and the gates 301 and 302 are connected together to the input of a master-slave type register 304 which receives the timing device signal $H_3$.

The output 353 of the register 304 is applied to one input of an adder 311 whose other input receives one of the three numerical constants $\Delta_1$, $\Delta_2$, $\Delta_3$ generated at 305, 306 and 307 and selected by the multigate tri-states 308, 309 and 310 respectively.

The output of the adder 311 is connected to the input of a master-slave register 313 which receives the timing device signal $H_2$. The output of the register 313 is applied, on the one hand to the other input of the numerical comparator 314, and on the other hand to the multigate 301. Finally, the output 358 of the numerical comparator 314 and the "carry" output 357 of the adder 311 are connected to the input of one OR gate 312 whose output is connected to the input of the gate 302 and the inverter 303.

Figure 6:
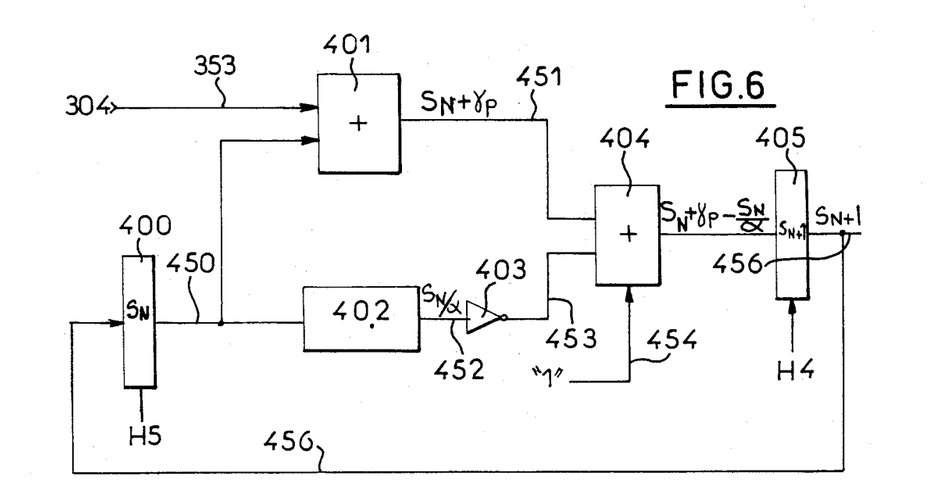

Now referring to FIG. 6, the output 353 of the master-slave register 304 is also connected to an input of an adder 401 whose other input is connected to the output of a register 400 which receives the timing device signal $H_5$. The output 450 of the register 400 also drives a divider 402 which divides the value Sn contained in the regester 400 by a number $\alpha$ equal to $2^k$, k being preferably a whole number. The output of the adder 401 and that of the divider 402, inverted by an inverter 403, are connected to the inputs 451, 453 of an adder 404 also provided with a "carry" input 454. The output of the adder 404 is connected to the input of a master-slave register 405 which receives the timing signal $H_4$ and whose output 456 drives the input of the register 400.

Figure 7:
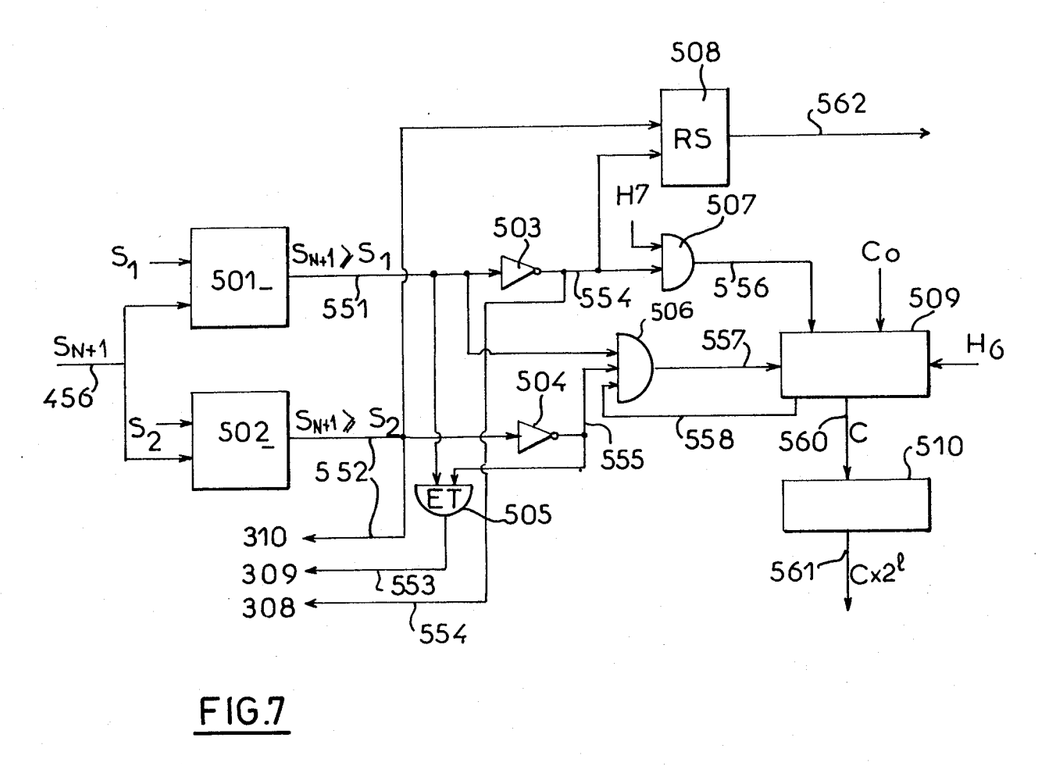

As shown in FIG. 7, the output 456 of the register 405 drives one of the two inputs of each of the two numerical comparators 501 and 502 whose other inputs are driven respectively by the $S_1$ and $S_2$ signals representing the predetermined numerical constants. The output 551 of the comparator 501 drives one input of an AND gate 507 by means of an invertor 503, one input of a second AND gate 506, and one input of a third AND gate 505. The AND gate 507 receives at its second input the timing signal $H_7$ and its output 556 drives the charged input of a counter 509 which also receives the timing signal $H_6$. The AND gate 506 exhibits two other inputs of which one is connected to the output 552 of the comparator 502 by means of an inverter 504 and whose other is driven by the output 558 of the counter 509 which delivers a binary signal "0" or "1" according to whether the count in the counter is equal to or different than zero. The output 557 of the AND gate 506 drives the counting authorization input of the counter 509 whose output 560 drives a multiplier by $2^1$, 1 being preferably a whole number.

In addition, the second input of the AND gate 505 is connected to the output of the inverter 504 and its output 553 drives the multigate tri-state 309 which selects the constant $\Delta_2$. The multigate tri-state 308 which selects the constant $\Delta_1$ is that one driven directly by the output 554 of the inverter 503. Finally, the multigate tri-state 310 which selects the constant $\Delta_3$ is directly driven by the output 552 of the numerical comparator 502.

This output 552 is also connected to the input which sets at 1 and RS (flip-flop circuit) 508 whose zero setting input is controlled by the output of the inverter 503.

Figure 8:
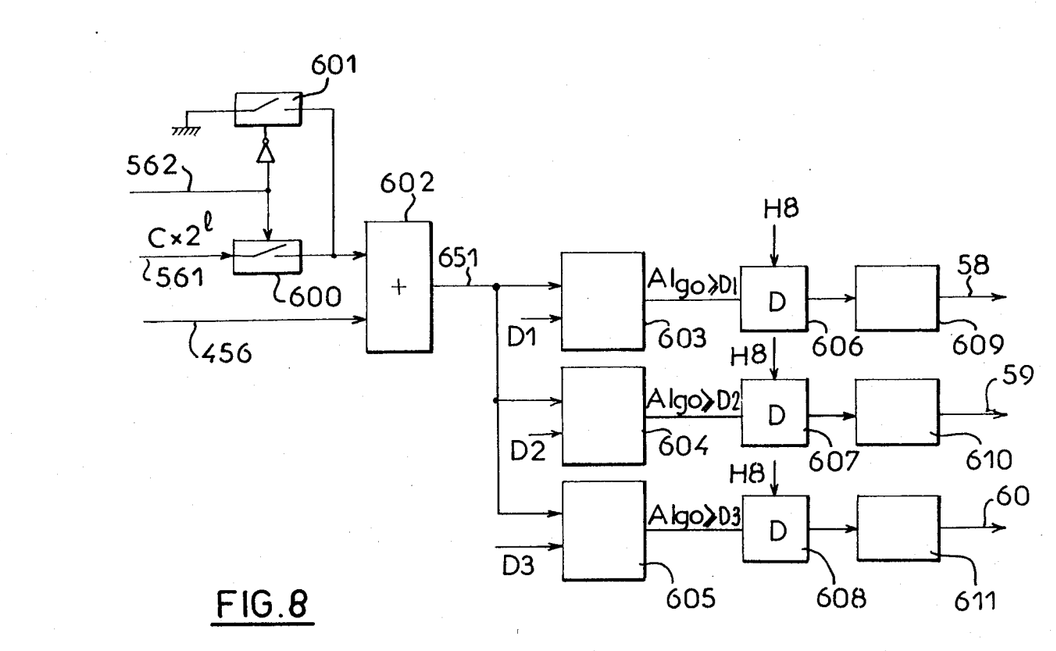

Also in reference to FIG. 8, the output 562 of the RS (flip-flop circuit) 508 drives one input of a multigate tri-state 600 and, by way of an inverter, one input of one other multigate tri-state 601 whose other input is grounded. The other input of the multigate 600 is driven by the output of the multiplier 510 by $2^1$ and the outputs of the gates 600 and 601 are connected together to one input of an adder 602. The other input of this adder 602 is driven by the output 456 of the register 405.

The adder 602 produces at its output 651 a signal representing the value of the algorithm calculated in the circuit previously described and this algorithm is compared to the values $D_1$, $D_2$, and $D_3$ in three numerical comparators 603, 604 and 605. These comparators drive respectively the flip-flop circuits D 606, 607 and 608 also receive the timing signal $H_8$ and respectively control the monostables 609, 610 and 611 whose respective outputs constitute the control outputs 58, 59 and 60 of the calculator 5.

In operation, the acceleration signal generated by the sensor 1 is amplified and filtered by the circuit 2. The numerical analog converter 3 furnishes the calculator 5 a numerical acceleration value.

The function of the calculator is to process the signal and to release, if necessary, one or more of the control actuators 58, 59, 60. In addition the calculator 5 diagnoses any eventual failure of said actuators through the inputs 61, 62, 63. In the event of failure, the failure indicator is activated by output 56 and the type(s) of failure are indicated at the diagnostic output 55 where a message, in the form of bits emitted in a series, signals the failure(s) that have been detected.

The calculator 5 regularly samples the acceleration signal by means of the connection 53.

FIG. 2 deals with the forming of the acceleration signal. The piezo-electric sensor is polarized by means of resistors 101, 102, 104, 105 and the regulator 106. The latter allows the converter 3 to provide the positive or negative acceleration values; accelerations are considered positive when the vehicle decelerates. The condensor 103 serves to eliminate high frequencies, and its capacity is much lower than that of the sensor 1. The resistors 102 and 102 are high enough to conserve the low frequencies used to detect a collision. The amplifier 100 is mounted as a follower in order to provide a very high input impedance. When leaving the amplifier 100 the signal is in a form to be processed by the numerical analog converter 3.

During normal operation, the transistor 107 is blocked. In order to assure the control of the sensor, for example when starting, the transistor 107 is saturated by the calculator by way of the connection 57. Then the sensor is polarized at OV. The transistor 107 is then blocked. The sensor, acting basically as a capacitor, experiences an exponential charge toward the level defined by the voltage Vref and the resistors 104 and 105.

The calculator verifies by means of the converter 3 whether the measured signal agrees with a tolerance near to a level according to an exponential defined by the capacity of the sensor, the resistors 101, 102, 104 105 and the voltage Vref as soon as the transistor 107 is blocked. In other words, the calculator 5 renders the transistor 107 conducting in order to polarize the sensor 1 at a zero voltage for a predetermined period of time, then renders the transistor 107 non-conducting in order to charge the sensor at a predetermined polarization and compares the sensor charge level to a predetermined charge level.

Figure 4:
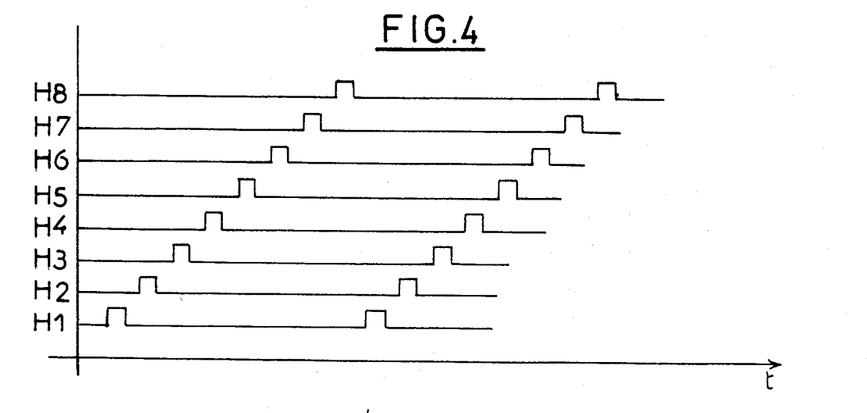
FIG. 4 is a chronogram showing the output signals $H_1$ to $H_8$ of the timing device in FIG. 3.

FIGS. 3 and 4 explain the function of the timing device 200 which guides all the operations of the system. The timing device 200 provides eight output signals (FIG. 4) which define eight sequential contingencies used in the function of the calculator.

The eight outputs $H_1$ to $H_8$ are numbered in chronological order. One period of the system is defined by the succession of these eight contingencies in the course of which an acceleration value is read. This value enters in the calculation of a new algorithmic term. When this calculation is made the decision is taken whether or not to activate one or more actuators designed to provide for the protection of the passengers.

The circuit in FIG. 5 causes the calculation of a weighted acceleration $\gamma p$ calculated from the acceleration $\gamma$ provided by the converter 3. The weighted acceleration is such that the positive increment between two successive weighted acceleration terms is limited to a positive value $\Delta$. In contrast the weighted acceleration is not limited with regard to the amount of decrease. Initially, in a stable regime, $\gamma p = \gamma$. In the event there is a change in $\gamma$ during a shock for example, one has the following:

$$\gamma p(n+1) = \gamma(n+1) \text{ if } \gamma(n+1) \leq \gamma p(n) + \Delta:$$

in the opposite case:

$$\gamma p(n+1) = \gamma p(n) + \Delta$$

(n) and (n+1) represent the order of scrutiny and (n+1) is the scrutiny which follows that of the order of (n).

It is this calculation that is carried out by the elements in FIG. 5. At the timing impulse $H_1$, the value of $\gamma$ provided by the converter 3 is captured in the register 300.

The weighted acceleration of the preceding period is presented in the master-slave type register 304. The adder 311 produces the sum $\gamma p\,(n) + \Delta$ which is captured in the register 313 at the timing impulse $H_2$. It is evident that the value $\Delta$ is chosen among the three values $\Delta_1, \Delta_2, \Delta_3$ of blocks 305, 306, 377. The computation is carried out by the gates 308, 309, 310 of which only one is opened by means of the outputs 554, 553, 552.

In the case where the adder 311 passes its capacity by the value of the result $\Delta p\,(n) + \Delta$, its carry output 357 is set at "1".

The value $\gamma p\,(n) + \Delta$ remaining in the register 313 is compared in the comparator 314 with the value $\gamma(n+1)$ issued from the register 300. If $\gamma(n+1) \leq \gamma p\,(n) + \Delta$ the output 358 is set at "1".

The "OR" gate 312 opens the multigate tri-state 302 if the result $\gamma(n+1) \leq \gamma p\,(n) + \Delta$ or if there is any reverse in 357. The multigate tri-state 302 sends a value $\gamma(n+1)$ to the register 304 which captures this value at the $H_3$ timing impulse. The multigate tri-state 301 is then closed by means of the inverter 303.

In the opposite case where neither of the outputs 357 or 358 is at "1", that is if the progression of $\gamma(n+1)$ is such that:

$$\gamma(n+1) > \gamma p(n) + \Delta,$$

the multigate is open and presents the result $\gamma p\,(n) + \Delta$ to the register 304 which replaces the value $\gamma p\,(n)$ with the new value $\gamma p\,(n+1) = \gamma p\,(n) + \Delta$ at the $H_3$ timing impulse.

The weighted acceleration value $\gamma p$ is taken up again for the following calculation at the output 353 of the master-slave register 304.

The circuit in FIG. 6 carries out the calculation of a series of terms $S_{(n)}$ such that:

$$S_{(n+1)} = S_{(n)} + \gamma p(n+1) - (S_{(n)}/\alpha)$$

where $\alpha$ is a constant. The series $S_{(n)}$ is an exponential mean value of the weighted acceleration $\gamma p\,(n)$ with multiplicative coefficient $\alpha$. In effect:

$$S_{(n)} = S_{(n+1)} \text{ if } S_{(n)} = \alpha \cdot \gamma p(n+1).$$

The object of the multiplicative coefficient is to conserve the entire definition provided by the converter 3. An ordinary exponential mean value would consist of dividing the two terms $\gamma p\,(n+1)$ and $S\,(n)$ by the constant $\alpha$. For the sake of convenience the constant $\alpha$ is preferably a power of the integer 2: $\alpha=2^k$, k being preferably a whole number.

The divider 402 in this case is realized by a simple shift of connections 450 containing the binary information of the register 400 representing the term $S_{(n)}$.

The term $S_{(n)}/\alpha$ is complemented by the multi-inverter 403. The adder 401 determines the sum $S_{(n)}+\gamma p$. The adder 404 determines the sum $(S_{(n)}+\gamma p)+(S(n)/\alpha)+1$ by means of inputs 451, 453 and the carry input 454.

The term $(S_{(n)}/\alpha)+1$ represents in fact $-(S_{(n)}/\alpha)$.

At the timing impulse $H_4$, the value $S_{(n+1)}=S_{(n)}+\gamma p-(S(n)/\alpha)$ is captured in the register 405. At the timing impulse $H_5$, the register 400 is brought into play with the new value $S_{(n+1)}$ which will serve as the basis for calculation during the following period.

FIG. 7 explains the selection of the weighting constants $\Delta_1$, $\Delta_2$, $\Delta_3$ and the mode of calculating a correction or correcting term present in the multi-connection 561.

The term $S_{(n+1)}$ in the present series at 456 is compared with two numerical values $S_1$ and $S_2$ with the aid of the numerical comparators 501 and 502 which respectively deliver a level "1" to the connections 551 and 552 if, respectively, $S_{(n+1)}$ is greater than $S_1$ and $S_2$.

The inverter 503 and the AND gate 505 allow the following selections:

$\Delta_1$ if $S_{(n+1)} < S_1$
$\Delta_2$ if $S_1 \leq S_{(n+1)} < S_2$
$\Delta_3$ if $S_{(n+1)} \geq S_2$ by means of the connections 554, 553, 552.

The correction calculation is carried out as follows:

When $S_{(n+1)}$ reaches the threshold $S_1$ and the timing impulse $H_7$ is present, the counter 509 is charged with an initial value $C_0$. At each period where $S_1 \leq S_{(n+1)} < S_2$, the output 557 authorizes the counter 509 to count one unit when the $H_6$ timing impulse occurs. The authorization at 557 is generated by means of the "AND" logic gate 506 and the inverter 504. If the counter reaches the value of 0, the counting authorization is canceled by means of the output 558 which provides a "0" level if the counter reaches 0. The value C present in the counter is multiplied by a coefficient $B=2^l$ (1 is preferably an integer) by the block 510. The block 510 consists in this case of a shift of the binary information in the counter 509 to the left by introducing the "0" levels in the lighter weight connections.

The RS type flip-flop circuit 508 permits the authorization or inhibition of the correction previously calculated:

the correcting term is authorized if $S_{(n+1)}$ exceeds threshold $S_2$;
the correcting term is inhibited if $S_{(n+1)}$ falls below the $S_1$ threshold.

Thus, it is evident that the correcting term is all the more important when the number of sampling periods is small between the point where the threshold $S_1$ is passed and that of the threshold $S_2$. If the number of periods between the passing of threshold $S_1$ and that of threshold $S_2$ is greater than or equal to the number $C_0$, the correction is zero.

When the correcting term has been calculated and authorized, it remains constant as long as $S_{(n+1)} \geq S_1$, but it takes a zero value if $S_{(n+1)}$ decreases below $S_1$.

Furthermore, as long as the series $S_{(n+1)}$ does not reach the $S_2$ threshold, the correction is not taken into account. This guarantees good immunity to small shocks even if they are hard.

The circuit in FIG. 8 carries out the calculation of the final algorithm and the release of the actuators with different thresholds.

The adder 602 sums up the term $S_{(n+1)}$ and the correction present at the output 561 of the multiplier 510 if the "authorization of the correcting term" output at 562 is at "1". One or the other of the multigate tri-states 600 and 601 is selected after adding or not adding the correction. The algorithm resulting at 651 is compared with three thresholds $D_1$, $D_2$, $D_3$, for example, corresponding to the protection adapted to the intensity of the shock. Comparison information is not captured until the $H_8$ timing impulse by the D type flip-flops 606, 607 and 608 captures a high level corresponding to the necessity of releasing a group of actuators, the monostables 609, 610 or 611 assure that the order of release is maintained for a long enough time to permit the effective release of the actuators concerned (pyrotechnic charge or unlocking the doors, for example).

FIGS. 9, 10, 11 and 12 explain the procedure for detecting shocks and releasing according to the invention in the situation where the calculator used is of the microprocessor type.

Figure 9:
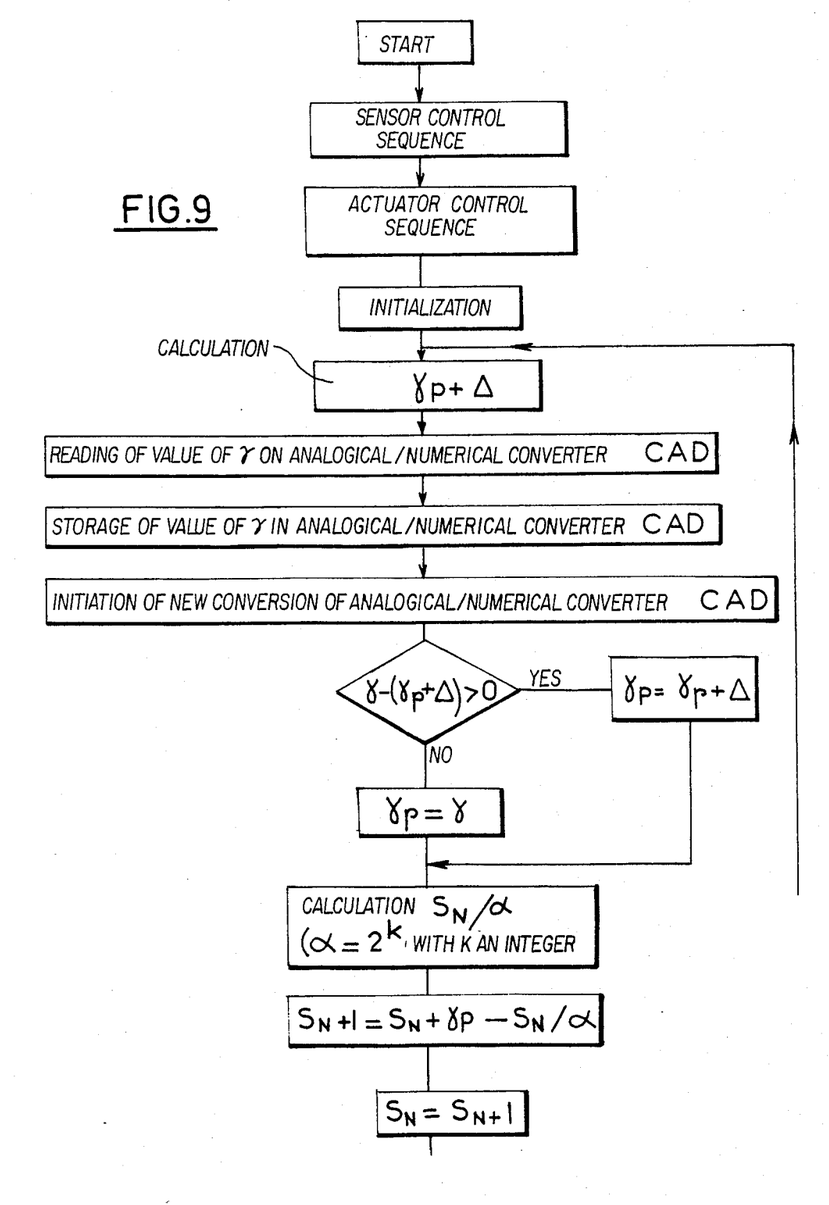
FIGS. 9 to 12 together constitute an algorithm illustrating the functioning of the method according to the invention in the case where it is used with a micro-programmed calculator, according to a second embodiment of the system in FIG. 1.

In FIG. 9, the sequence of operations begins when tension is applied. A control sequence for the sensor(s) and actuators is carried out at the very beginning. An initialization phase follows, for example:

$\gamma = \gamma p = \gamma o$
$R = o$
$\Delta = \Delta_1$
$S_n = S_{n+1} = \alpha \cdot \gamma o$ This phase also includes:
measuring the stabilized level of the $S_{(n)}$ series, defined by the polarization of the motor starting sensor;
calculating the thresholds $D_1$, $D_2$, $D_3$ by differentiation with the measured stabilized level;
starting a conversion for the converter 3.

The following is a cycle which includes a reading of the acceleration, calculating the formation of the algorithm and the release decision for one or more groups of actuators.

Figure 10:
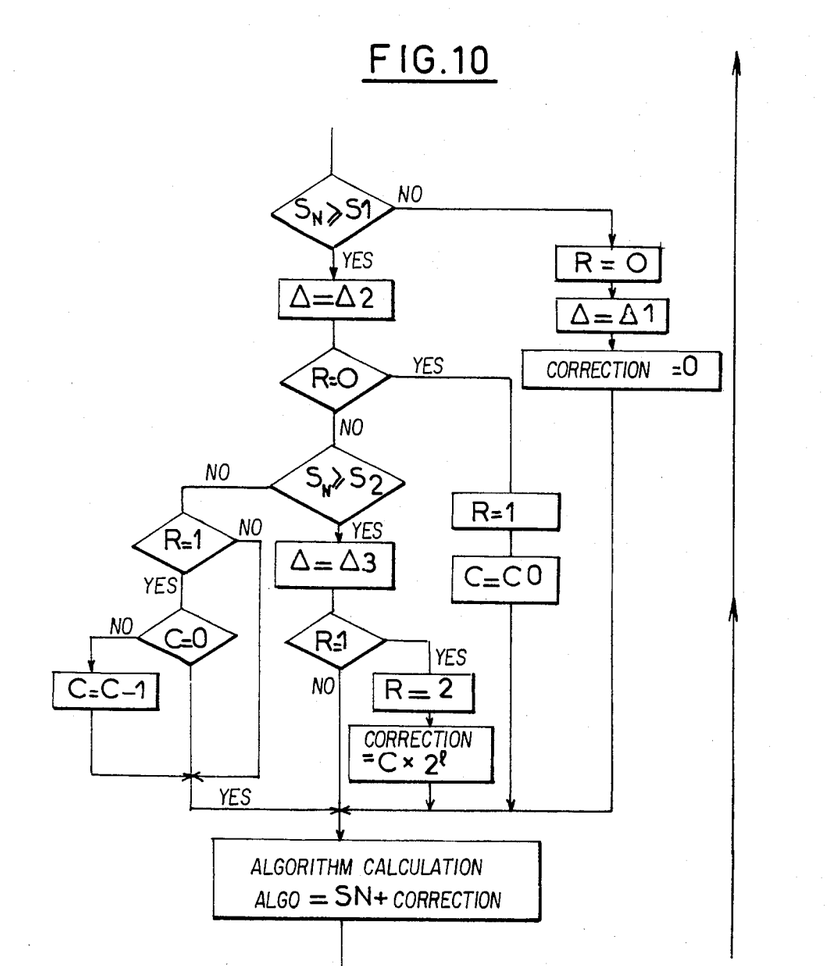
Figure 11:
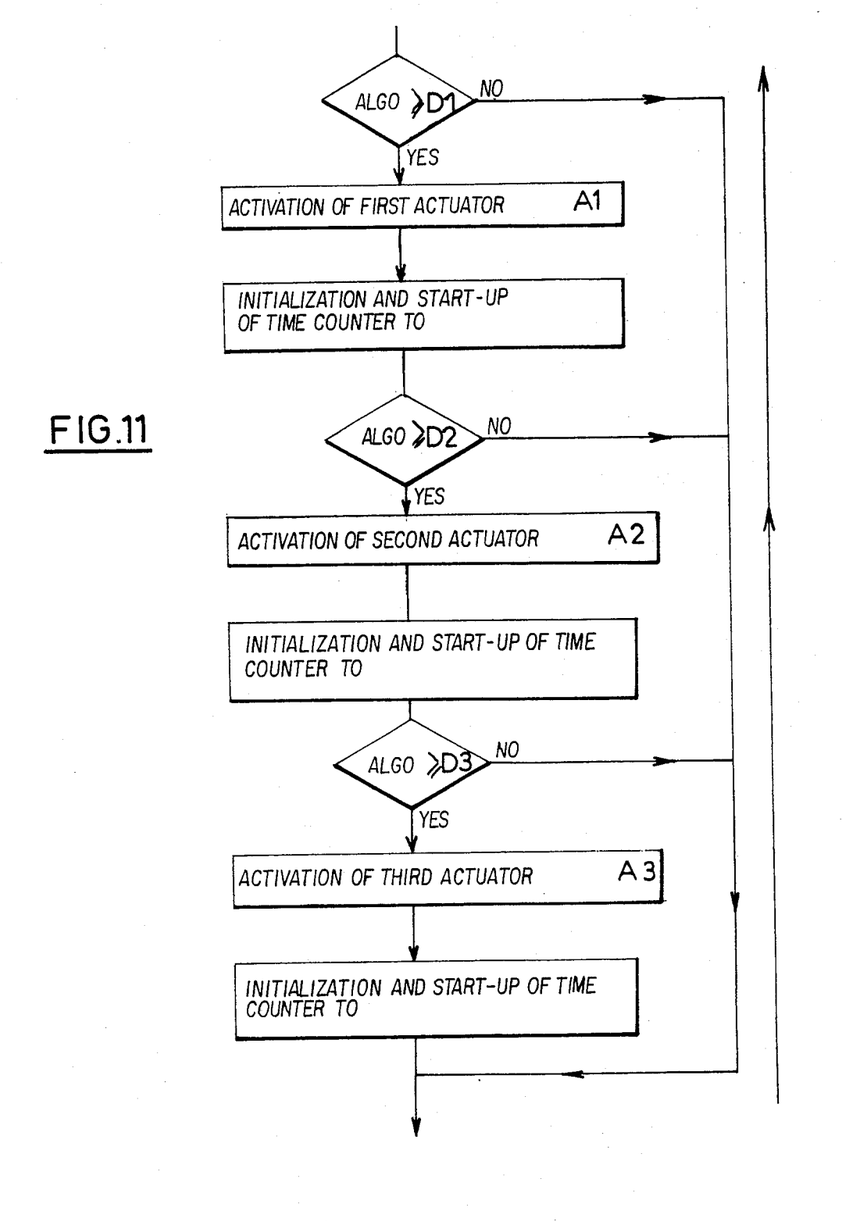
Figure 12:
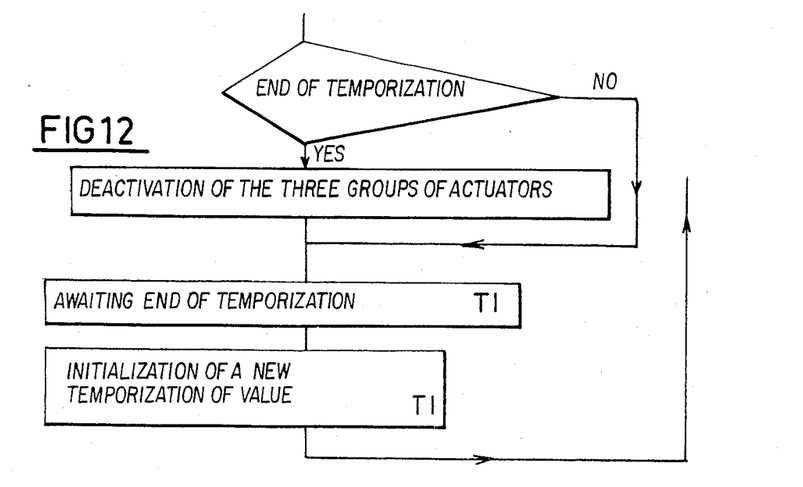

Beginning of the cycle:
calculation of $\gamma p + \Delta$
reading the value of $\gamma$ in the numerical analog converter
storing these values in a register;
starting a conversion of the numerical analog converter
calculation of $\gamma - (\gamma p + \Delta)$
If this term is positive do $\gamma p = \gamma p + \Delta$
If not, do $\gamma p = \gamma$
calculation of $S_{(n)}/\alpha$ by shifting the bits in a register ($\alpha$ being a power of 2);
calculation of $S_{(n)} + \gamma p - (S_{(n)}/\alpha)$
doing $S_{(n)} = S_{(n+1)}$ The sequence of the cycle is illustrated by FIG. 10 which is a logical sequence of FIG. 9. It consists of:
testing whether $S_n \geq S_1$
If the condition is not satisfied, doing $R=0$, R being a "flag" capable of taking one of three values 0, 1 or 2,
$\Delta = \Delta_1$
Correction = 0
and jumping to "Algo = $S_n$ + correction" which constitutes the phase of calculating the algorithm.
If the condition is satisfied:
do $\Delta = \Delta_2$ test whether R=0
  If the condition is satisfied do
    R=1
    C=Co (Co entire value)
    and jump to "algorithm calculation".
  If the condition is not satisfied,
test whether R=1:
  If the condition R=1 is not satisfied, jump to "algorithm calculation"
test whether $S_n \geq S_2$
  if the condition is fulfilled, let $\Delta = \Delta_3$
  If the condition R=1 is satisfied
    do R=2
    calculate correction=$C \times 2^1$ (whole number value)
  If the condition $S_n \geq S_2$ is not satisfied,
    Test R=1
      If the condition is satisfied, jump to "algorithm calculation"
      If the condition is satisfied
    Test whether C=0
      If the condition C=0 is satisfied, jump to "algorithm calculation"
      If the condition C=0 is not satisfied, do
        C=C−1
"Algorithm calculation"
  do Algp=$S_n$+correction
Referring now to FIG. 11 which is a logic sequence progressing from FIG. 10 and where the following phases of the procedure are illustrated:
test whether Algo$\geq D_1$
  If the condition is not satisfied jump to "final temperization test T0" (FIG. 11)
  If the condition Algo$\geq D_1$ is satisfied:
    Activation of the first actuator $A_1$;
    Initialization and beginning of time counting T0
test whether Algo$\geq D_2$
  If the condition is not satisfied jump to "final temporization test T0"
  If the condition Algo$\geq D_2$ is satisfied;
    Activation of the second actuator $A_2$;
    Initialization and beginning of time counting T0
test whether Algo$\geq D_3$
  If the condition Algo$\geq D_3$ is not satisfied jump to "final temporization test T0"
  If the condition Algo$\geq D_3$ is satisfied:
    Activation of the third actuator $A_3$;
    Initialization and beginning of time counting T0.
FIG. 12 is a logic series progressing from FIG. 11 and illustrates the following phases:
"final timing test T0"
  If the timing T0 is not terminated jump to "Awaiting termination of timing T1"
  If the timing T0 is terminated, deactivation of the three actuators;
"Awaiting termination of timing T1" the system loops to this instruction as long as the timing T1 is not terminated.
Initiating a new timing phase T1.
jump to "Leave loop", this constitutes the last instruction in the cycle.

Of course, the invention is not limited to the two embodiments described above. Thus provision can be made to release many actuators instead of a single actuator $A_1$, $A_2$ or $A_3$ as a function of exceeding the threshold $D_1$, $D_2$ or $D_3$. More generally, the algorithm could be compared with one, two, or more than three thresholds and, in a similar manner, the exponential mean value $S_n$ could be compared with more than two thresholds and consequently use more than three constants $\Delta_1$, $\Delta_2$ and $\Delta_3$ for calculating γp and more than one correcting term for calculating the algorithm.

Obviously, numerous modifications and variations of the present invention are possible in light of the above teachings. It is therefore to be understood that within the scope of the appended claims, the invention may be practiced otherwise than as specifically described herein.

I claim:

1. A method of detecting collisions and controlling safety devices for vehicle passengers in which the vehicle decelerations are continuously measured and in which the measured signals are converted into a numerical signal which represents the deceleration of the vehicle with said numerical signal being processed and compared with predetermined values so that the release of the safety devices is controlled as a function of the result of the comparison, comprising the following steps carried out in cycles with each cycle having a constant duration:

calculating a weighted acceleration value based upon said numerical deceleration value for a first cycle and at least one of three constants;

producing an mean value of the weighted acceleration value;

comparing said mean value with at least a first and a second predetermined value;

choosing one of said constants to calculate the weighted acceleration value during the following cycle as a function of the result of said comparison;

calculating a correcting term value each time said mean value exceeds successively said first predetermined value and said second predetermined value wherein said correcting term value is a function of the time between the successive excessions of said two predetermined values;

retaining said calculated correcting term value as said correcting term as long as said mean value is greater than or equal to said first predetermined value but is less than the value of said second predetermined value;

assigning to said correcting term a value of zero when said mean value decreases below said first predetermined value;

calculating an algorithm having a value equal to the sum of said mean value and said correcting term;

comparing said algorithm value to at least one threshold value; and releasing at least one of said safety devices when said algorithm value is greater than or equal to said at least one threshold value.

2. The method according to claim 1 wherein said weighted acceleration value is calculated by comparing the value of the numerical deceleration to the sum of both the weighted acceleration value and the constant determined during the preceding cycle and by giving the said weighted acceleration the value of said sum if the value of the numerical deceleration is greater than the said sum, and by giving the said weighted acceleration the value of the numerical deceleration if the numerical deceleration value is less than or equal to the said sum.

3. The method according to one of the claims 1 and 2, wherein said mean value is calculated according to the following formula:

$$S_{(n+1)} = S_{(n)} + \gamma p - (S_{(n)}/\alpha)$$

in which $S_{(n+1)}$ represents the actual value of the mean value, $S_{(n)}$ represents the value of the exponential average calculated during the preceding cycle, ($\gamma p$) represents the value of the weighted acceleration which will be calculated at the beginning of the cycle in progress where $\alpha$ is a constant.

4. The method according to one of the claims 1 and 2, wherein the value of the correcting term is calculated by means of a counter which is set off at a predetermined number (Co) when said mean value $S_{(n+1)}$ exceeds the first predetermined value ($S_1$) and which is decreased in each cycle, the counting of the counter being interrupted when said mean value ($S_{n+1}$) exceeds the second predetermined value ($S_2$) after having exceeded the first ($S_1$) or when the counter contents reach a zero value, the correcting term being a function of the contents of the counter at the moment of said interruption multiplied by a coefficient ($2^1$).

5. A system for detecting collisions and controlling safety devices comprising: at least one capacitor deceleration sensor, a forming circuit for the output signal of the sensor, a numerical-analog converter, a numerical calculator and at least one actuator controlled by the numerical calculator, wherein said forming circuit (2) comprises an electronic commutator to polarize said sensor (1) at a zero voltage for a predetermined period, then rendered non-conductive by the calculator (5) to charge the sensor at a predetermined polarization, the calculator (5) being adapted to compare the charge level of the sensor with a predetermined charge level.

* * * * *

UNITED STATES PATENT AND TRADEMARK OFFICE
CERTIFICATE OF CORRECTION

PATENT NO. : 4,497,025

DATED : January 29, 1985

INVENTOR(S) : Gilles Hannoyer

It is certified that error appears in the above-identified patent and that said Letters Patent is hereby corrected as shown below:

On the title page, item /54/ should read:
-- [54] PROCEDURE AND SYSTEM FOR DETECTING COLLISIONS AND CONTROLLING SAFETY DEVICES --

Signed and Sealed this

Thirtieth Day of April 1985

[SEAL]

*Attest:*

DONALD J. QUIGG

*Attesting Officer*         *Acting Commissioner of Patents and Trademarks*